United States Patent
Jones et al.

(10) Patent No.: US 8,246,804 B2
(45) Date of Patent: Aug. 21, 2012

(54) TREATMENT OF AQUEOUS CHEMICAL WASTE

(75) Inventors: Christopher Peter Jones, Swindon (GB); Peter James Mawle, Bath (GB)

(73) Assignee: Edwards Limited, Crawley, West Sussex (GB)

( * ) Notice: Subject to any disclaimer, the term of this patent is extended or adjusted under 35 U.S.C. 154(b) by 1414 days.

(21) Appl. No.: 10/572,187

(22) PCT Filed: Sep. 10, 2004

(86) PCT No.: PCT/GB2004/003876
§ 371 (c)(1),
(2), (4) Date: May 18, 2007

(87) PCT Pub. No.: WO2005/026055
PCT Pub. Date: Mar. 24, 2005

(65) Prior Publication Data
US 2007/0246429 A1    Oct. 25, 2007

(30) Foreign Application Priority Data

Sep. 15, 2003    (GB) .................................... 0321579.5

(51) Int. Cl.
*B01D 61/00*    (2006.01)
*B01D 53/04*    (2006.01)
*B01D 61/48*    (2006.01)
*B01D 17/06*    (2006.01)
*G01N 27/00*    (2006.01)
*C02F 1/461*    (2006.01)

(52) U.S. Cl. ........ 204/536; 204/551; 204/632; 204/647; 205/742; 205/687

(58) Field of Classification Search .................. 204/520, 204/522, 533, 551, 632, 647; 205/742, 687
See application file for complete search history.

(56) References Cited

U.S. PATENT DOCUMENTS
3,607,694 A * 9/1971 Heit et al. ..................... 204/522
(Continued)

FOREIGN PATENT DOCUMENTS
EP    1 075 868 A2    2/2001
(Continued)

OTHER PUBLICATIONS
Hawley's Condensed Chemical Dictionary, 14 ed., John Wiley & Sons 2002, definition of anion.*
(Continued)

*Primary Examiner* — Keith Hendricks
*Assistant Examiner* — Colleen M Raphael

(57) ABSTRACT

A method for the treatment of an aqueous stream containing both anionic and cationic species is provided. The method comprises the following steps. Circulating water continuously through an essentially closed loop, the loop incorporating an ion adsorption unit which, in turn, comprises a water permeable layer of an ion adsorbing material. Feeding an aqueous solution containing the anionic and the cationic species to the essentially closed loop. Passing the circulating water, including the aqueous solution containing the ionic and the cationic species, through the ion adsorbing material in the ion adsorption unit in a continuous manner. While at the same time applying an electric potential across the thickness of the layer of ion adsorbing material and removing from the ion adsorption unit more concentrated aqueous solutions of the separate ionic species. Discharging each of the aqueous solutions from the ion adsorption unit. Passing the more concentrated solution of the other ionic species through a reaction unit in which the ionic species reacts to form a water-insoluble solid material. Recycling eluate from the reaction unit to the ion adsorption unit; and, if necessary, adding a quantity of water to the closed loop, this quantity corresponding the quantity of aqueous solution removed from the reaction unit.

13 Claims, 2 Drawing Sheets

U.S. PATENT DOCUMENTS

| | | | |
|---|---|---|---|
| 4,599,156 A | | 7/1986 | Srinivasan et al. |
| 4,687,561 A | * | 8/1987 | Kunz .......................... 204/524 |
| 4,871,431 A | * | 10/1989 | Parsi .......................... 204/524 |
| 4,969,983 A | * | 11/1990 | Parsi .......................... 204/524 |
| 5,215,632 A | * | 6/1993 | Fritts et al. ................. 205/503 |
| 5,225,056 A | * | 7/1993 | Bridger et al. .............. 205/742 |
| 5,403,495 A | * | 4/1995 | Kust et al. .................. 210/710 |
| 5,413,682 A | | 5/1995 | Thornton et al. |
| 5,584,981 A | * | 12/1996 | Turner et al. ................ 204/536 |
| 6,074,537 A | * | 6/2000 | Marks et al. ................ 204/263 |
| 6,274,019 B1 | | 8/2001 | Kuwata |
| 6,613,230 B2 | * | 9/2003 | Krulik et al. ................ 210/638 |
| 6,652,758 B2 | * | 11/2003 | Krulik .......................... 210/721 |
| 2002/0020626 A1 | | 2/2002 | Sato |
| 2006/0101995 A1 | * | 5/2006 | Mawle .......................... 95/64 |

FOREIGN PATENT DOCUMENTS

| | | |
|---|---|---|
| EP | 0 680 932 B1 | 8/2001 |
| WO | WO 03/062150 A1 | 7/2003 |

OTHER PUBLICATIONS

Hawley's Condensed Chemical Dictionary, 14 ed., John Wiley & Sons 2002, definition of cation.*

Notification of Transmittal of the International Search Report and the Written Opinion of the International Searching Authority, or the Declaration(3 pp); International Search Report (Application No. PCT/GB2004/003876, mailed Oct. 5, 2005, 4 pp); Written Opinion of the International Searching Authority (3 pp).

Search Report under Section 17 of GB 0321579.5 from the British Patent Office dated Mar. 12, 2004 (1 p.).

* cited by examiner

TREATMENT OF AQUEOUS CHEMICAL WASTE

BACKGROUND OF THE INVENTION

This invention relates to the treatment of toxic and/or environmentally hazardous or harmful materials and more especially to the treatment of aqueous solutions of hazardous waste arising from various chemical processes.

The chemical processing industry in general generates vast quantities of by-products and waste materials many of which represent environmental hazards and which must be neutralised or destroyed as an essential part of their ultimate disposal. The oil and gas processing industries, for example, invest heavily in plant and equipment designed specifically to prevent or minimise the release of harmful largely organic materials into the environment. The microelectronics and semi-conductor device manufacturing industries, for example, make similar investments in order to scrub or otherwise treat exhaust gas streams containing generally inorganic materials from chemical processing units prior to the release of those exhaust gases into the atmosphere. Compounds containing heavy metals and halogen-, sulphur-, phosphorus- and nitrogen-containing compounds can be especially toxic and their removal is the subject of a considerable amount of technical research and of much environmental protection legislation.

Many of the procedures utilised in the microelectronics and semi-conductor device manufacturing industries use fluorine-containing compounds. Unused fluorine-containing compounds and fluorine-containing products and by-products are generally discharged from the process or from a subsequent exhaust treatment, for example scrubbers and other adsorption systems, as an aqueous waste stream. This aqueous waste stream will generally contain fluorine in the form of HF. However, cationic species such as $NH_4^+$ may also be present, in addition to fluoride in the form of bifluoride ions, $HF_2^-$.

Current practise in such manufacturing and disposal facilities involves treating the aqueous fluoride stream with magnesium or calcium salts in order to precipitate the sparingly soluble $MgF_2$ and $CaF_2$, usually the latter. The solid material can then be compacted and dried for ease of transport for disposal or further use. However, the water stream will still have a fluoride content of some 20 to 30 ppm which continues to present a disposal problem with discharge limits of 3 ppm being more generally imposed.

Further, some legislative areas prohibit the dilution of certain waste streams (for example, aqueous fluoride with an aqueous stream containing no fluoride) for disposal purposes and in other areas allowable discharge is based on the quantity of discharged species and not their concentrations. The safe disposal of hazardous and harmful materials therefore presents ever increasing problems.

A further difficulty is that effluent from recently developed procedures which use a mixture of ammonium bifluoride and HF cannot be accommodated in a calcium precipitation installation because $CaF_2$ will not form at pH below 12 and such high pH values favour the dissociation of ammonium species to produce ammonia gas. Additional facilities are then required to remove and separate $NH_4^+$ and $F^-$ before they can be treated to form solid waste. This can be achieved using traditional ion exchange techniques but the plant will be large in that it will require separate beds for the two ion exchange species and duplex systems with further chemical feeds for their periodic regeneration.

A recently developed system that is capable of removing both anionic and cationic species from aqueous solutions without requiring further chemical additives makes use of a technique known as electrochemical deionisation which involves ion exchange and electrolytic separation technologies. In this system cations or anions of interest are adsorbed from dilute aqueous solution onto an ion exchange medium, transported through that medium by an applied electric field and continuously eluted as a concentrated stream. Such a procedure is described in EP 0680932B. There are many examples within the existing literature of electrochemical cells that combine adsorption and ion separation and EP 0680932B illustrates one such ion removal/separation/concentration process. Other approaches will be known to those skilled in the art and can also be used. Such systems have been applied with some success on a continuous basis to minimise water consumption and to concentrate anions or cations for ease of subsequent handling in our copending Patent Application No. GB 0300793.7. That application demonstrates especially that fluoride ions can be concentrated and removed from a closed loop circulation system.

Further work has now revealed that the techniques and procedures described in GB 0300793.7 may be applied successfully to the problems described above. In this respect the structure of the electrochemical deionisation cell described and illustrated in GB 0300793.7 has been modified to permit the simultaneous removal of both anions and cations.

BRIEF SUMMARY OF THE INVENTION

In accordance with the invention, there is now provided a method for the treatment of aqueous streams containing both anionic and cationic species, the method comprising the steps of:

continuously circulating water through an essentially closed loop incorporating an ion adsorption unit comprising a water permeable layer of an ion adsorbing material;

feeding to the essentially closed loop an aqueous solution containing the anionic and the cationic species;

continuously passing the circulating water including the aqueous solution containing the an ionic and the cationic species through the ion adsorbing material in the ion adsorption unit while applying an electric potential across the thickness of the layer of ion adsorbing material and removing from the ion adsorption unit more concentrated aqueous solutions of the separate ionic species;

continuously discharging from the ion adsorption unit the more concentrated aqueous solution of one ionic species;

continuously discharging from the ion adsorption unit the aqueous solution depleted in anionic and cationic species;

continuously passing the more concentrated solution of the other ionic species through a reaction unit in which the ionic species reacts to form a water-insoluble solid material;

continuously recycling the eluate from the reaction unit to the ion adsorption unit; and, if necessary, adding to the closed loop a quantity of water corresponding to the quantity of aqueous solution removed from the closed loop with the solids in the reaction unit.

In a separate aspect, the invention provides also apparatus for use in carrying out the method described above, the apparatus comprising:

an essentially closed loop circulation system containing (i) an ion adsorption unit comprising a water permeable zone of an ion adsorbing material and means for enabling an electrical potential to be applied across the thickness of the ion adsorbing zone and (ii) a reaction unit in which one of the anionic and cationic species is rendered substantially insoluble;

a pump for continuously circulating aqueous solution around the closed loop;

an inlet for an aqueous solution containing anionic and cationic species to the closed loop circulation system;

an outlet for concentrated aqueous solution of one ionic species from the ion adsorption unit;

an outlet for depleted aqueous solution from the ion adsorption unit;

an outlet for solid from the reaction unit; and an inlet for water into the closed loop circulation system.

The ion adsorption unit employed as an essential aspect of the method and apparatus of the invention preferably incorporates both anion adsorbing and cation adsorbing capabilities in the unit. However, if necessary or desirable, it may be advantageous to use two separate ion adsorption units disposed in series one for anion adsorption and the other for cation adsorption. Still further, an ion adsorption unit having both anion adsorbing and cation adsorbing capabilities may be supplemented by a series-connected ion adsorption unit having only an anion adsorbing or a cation adsorbing capability. The precise arrangement will depend upon the relative concentrations of the anionic and cationic species in the aqueous solution fed to the ion adsorption units, the efficiency of the ion adsorption units in removing anions and/or cations of interest from the aqueous solution and the residual concentrations of the anions and the cations in the depleted aqueous solution having regard to any further treatment to which that solution may be subjected. In general terms, however, the skilled person will have no special difficulty in selecting the most appropriate combination of ion adsorption units and ion adsorbing materials for the particular situation and circumstances.

The ion adsorbing materials serve to capture the ions of interest and are preferably ion exchange materials such as ion exchange resins in the form of particles or beads or other materials that can provide:

a solution permeable medium;

an ion adsorption medium (to remove the anions or cations);

an ion conducting medium whereby the ions may be moved by the imposed electrical field into a separate solution.

The particles or beads of the resins are preferably in a coherent form, that is to say they are not mobile or loose but are constrained in a predetermined configuration. For example, the particles of beads may be bound together with a binder or held between layers of a mesh or membrane so as to be permeable to the aqueous solution containing the ions, the mesh or membrane being permeable as appropriate for the removal and concentration of the ions of interest. The electrical potential which is applied across the thickness of the layer of ion adsorbing material serves to drive the captured ions through the ion adsorbing material towards one or other of the electrodes through which the potential is applied. The electrical potential may be generated from a pair of electrodes arranged to form an electrolysis cell or by any alternative arrangement, for example in the form of an electrophoresis cell.

It will be understood that the ion adsorption unit consisting of ion exchange material is, in operation, self-regenerating in that it effectively transports the captured cations and/or anions through its bulk for discharge as a concentrated aqueous solution, and will regenerate to its hydrogen or hydroxide form when no other cationic or anionic species is present. Such an electrically regenerating ion exchange unit is referred to hereinafter as an ERIX unit for the sake of brevity. Such units may comprise many ion removal and concentration channels in parallel and will be known to those skilled in the art.

It has been found that using the method and apparatus according to the invention it is possible to effect continuous separation of anions and cations with a closed loop circulation system without any need for regenerating or periodically replacing the ion adsorbing materials. The efficiency of the method and apparatus will depend upon the nature of the ion adsorbing materials and of the ions to be captured, the concentration of the ions in the solution and other factors such as flow rates and electrical potentials but initial indications are that ion extraction rates of up to 98% per pass can be achieved.

With such high extraction rates, the removal of acid anions such as $F^-$ as well as $SO_4^{2-}$ and $NO_3^-$ will have a dramatic effect upon improving the service life of the equipment in the circulating system, such as pumps, meters, valves and baffles.

The method of the invention is applicable to a wide variety of anionic species such as sulphate, sulphite, nitrate, nitrite, phosphate, phosphite and halides, that is to say fluoride, chloride, bromide and iodide as well as cationic species especially metals and more especially heavy metals.

The invention does, however, have particular applicability to fluoride such as that generated as a by-product of the semi-conductor device manufacturing industry and which produces aqueous hydrofluoric acid as a result of reaction followed by dissolution in a gas scrubbing plant. The invention is most especially useful for aqueous solutions containing both fluoride and ammonium ions which have been difficult to separate in a satisfactory manner by more traditional techniques, as described above.

In its preferred aspect, therefore, the invention permits the separation of ammonium and fluoride ions from aqueous solution using an electrically regenerating ion exchange (ERIX) system. By incorporating the ERIX unit into a recirculation loop, the concentrated fluoride solution can be passed through a calcium precipitation unit thereby capturing fluoride in solid form. The eluate from the precipitation unit can then be recycled to the ERIX unit in combination with additional waste water feed.

In this manner, fluoride is safely and efficiently removed from the waste water as solid $CaF_2$, ammonium ions are separated and discharged and purified water is obtained.

In an especially preferred method, the amount of calcium admitted to the precipitation unit is significantly less than that required by stoichiometric considerations for capturing all of the fluoride ions in the concentrated stream discharged from the ERIX unit. In this way, the fluoride ion concentration in the effluent from the precipitation unit can be maintained at a level such that the concentration of calcium in that effluent is extremely low. This in turn helps to safeguard the ERIX unit which could rapidly become clogged, or at least severely contaminated, by solid calcium deposits derived from soluble calcium in the effluent.

The calcium that is fed to the precipitation unit for the formation of $CaF_2$ is preferably in soluble form but simple economic considerations may demand the use of calcium in an insoluble or sparingly soluble form. For example, calcium hydroxide slurries and calcium carbonate slurries may be used with advantage. However, a considerable quantity of water will be required to form such slurries and it may therefore be advantageous to use at least some of the treated water exiting the ERIX unit for this purpose. In this manner there is little or no necessity to introduce fresh water into the loop.

In an alternative arrangement, fluoride-containing eluent from the precipitation unit may be recycled for the purpose of forming the calcium slurry. This alternative has the advantage of consuming some of the fluoride exiting the precipitation unit and thereby reducing the fluoride burden on the ERIX unit.

BRIEF DESCRIPTION OF THE DRAWINGS

The invention is described below in greater detail by way of example only with reference to the accompanying drawings, in which.

DETAILED DESCRIPTION OF THE INVENTION

Figure 1:
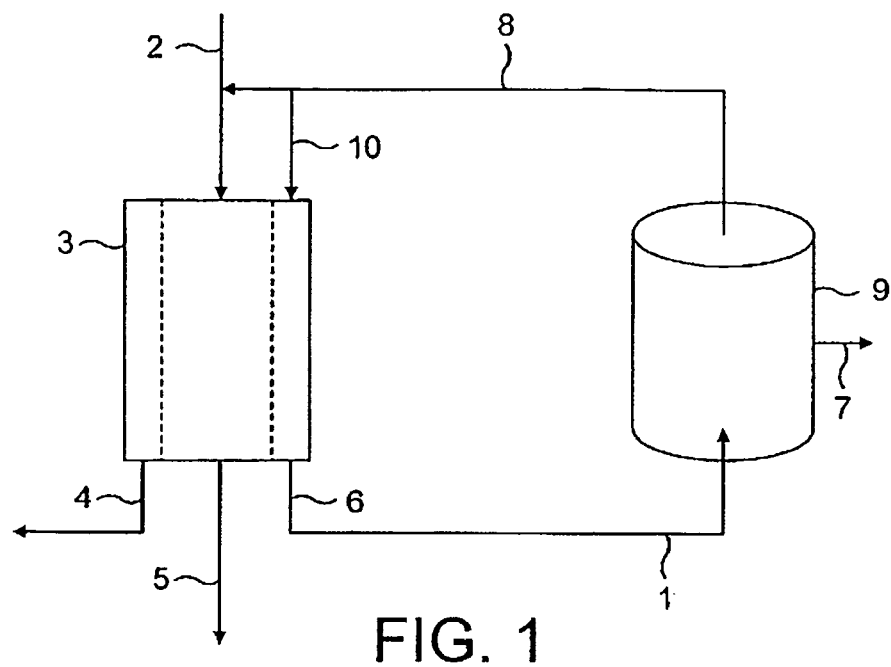
FIG. 1 is a schematic representation of a closed loop circulation treatment apparatus according to the invention.

Referring to the drawings, in FIG. 1 there is shown a schematic representation of apparatus according to the invention. An aqueous ion containing solution containing fluoride and ammonium ions is admitted into an ion adsorption unit 3 (ERIX unit) forming part of a closed loop circulation system 1, via line 2. Within the ERIX unit 3 (an example of which is described in detail by reference to FIG. 4 of the drawings) the aqueous solution is treated and separated to form a concentrated ammonium solution which is discharged through line 4, a concentrated fluoride solution which is discharged through line 6 and a depleted aqueous solution which is discharged through line 5.

The line 6 containing the concentrated fluoride solution forms part of the closed loop circulation system 1 and leads to a circulation pump (not shown) for maintaining circulating flow within the loop. A separate line may be provided for make-up water, if required, although such make-up water can be admitted at almost any part of the loop system 1.

Downstream of the pump there is a precipitation unit 9 containing a suitable source of calcium (preferably in soluble form) which reacts with the fluoride solution to form insoluble $CaF_2$. Such precipitation units are well known to those skilled in the art and do not require detailed description here. Precipitated $CaF_2$ is removed through line 7.

The eluate from the precipitation unit 9 contains only 20 to 30 ppm $F^-$ and passes by way of line 8 to the line 2 through which fresh fluoride/ammonium solution enters the system. If desired, some of the fluoride containing eluate in line 8 may be admitted to the fluoride concentrate side of the ERIX unit 3 via line 10.

Figure 2:
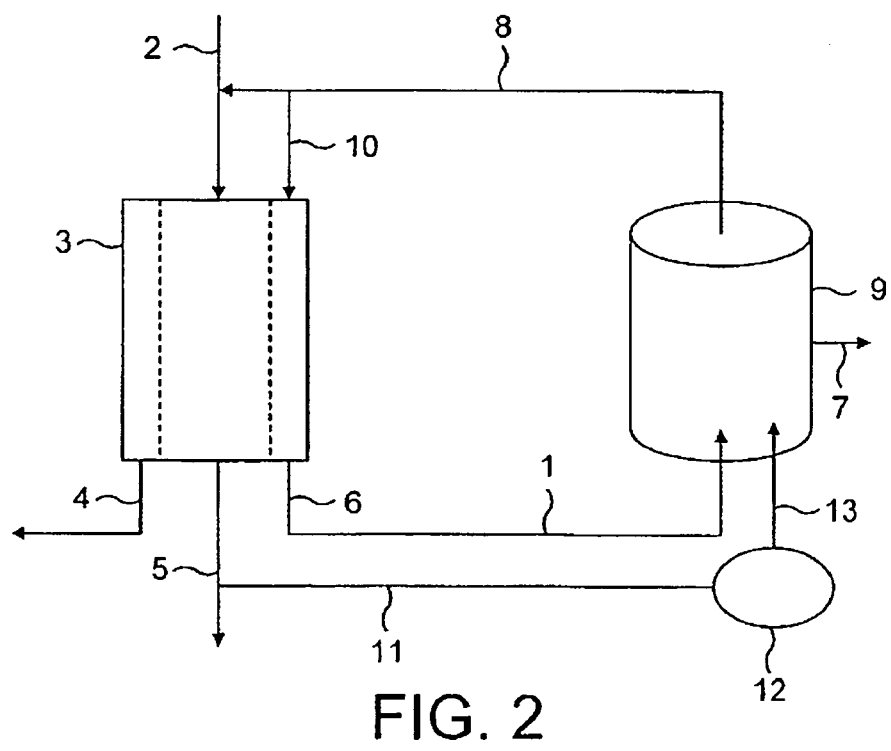
FIG. 2 is a schematic representation of a preferred form of closed loop circulation treatment apparatus according to the invention.

A modified and preferred form of apparatus is represented schematically in FIG. 2. That apparatus is similar in most respects to that shown in FIG. 1 except that some of the water exiting the ERIX unit through line 5 is taken via a bleed line 11 to a mixing tank 12 where it is used to form the source of calcium as solution or slurry. That in turn is passed through line 13 to the precipitation unit 9. In this manner, the water balance of the system is more easily controlled and maintained.

Figure 3:
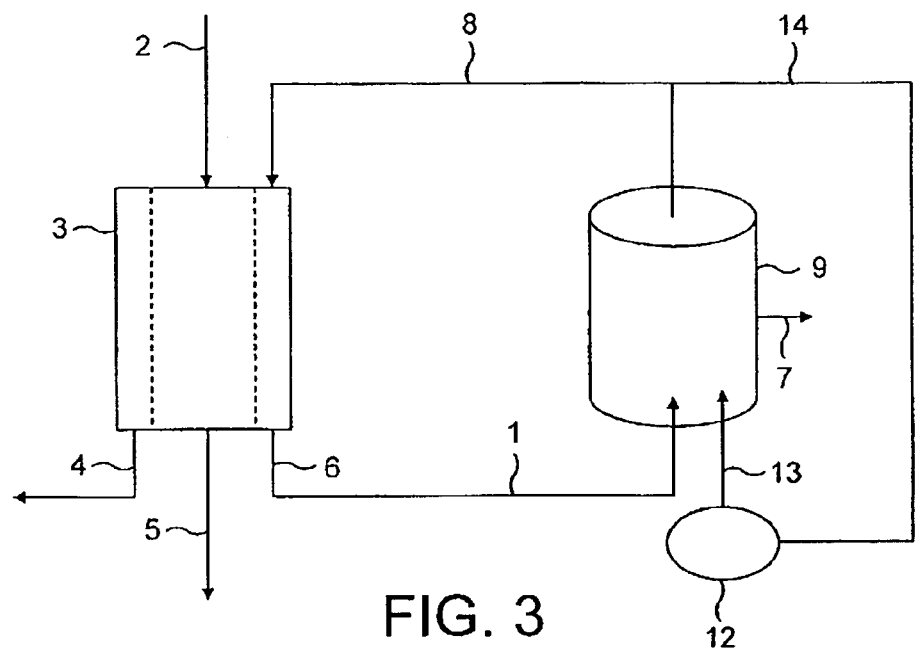
FIG. 3 is a schematic representation of a further form of closed loop circulation treatment apparatus according to the invention.

A still further modification of the apparatus is shown in FIG. 3. In this case, however, the calcium hydroxide is slurried not with water exiting the ERIX unit via line 5 but with recycled water from the calcium fluoride precipitation unit taken from line 8 through line 14. As noted above, this arrangement reduces the burden on the ERIX unit by reducing significantly the quantity of aqueous fluoride recycled through the ERIX unit. In fact, as shown in FIG. 3, the recycled aqueous fluoride can be cycled entirely past the back surface of the ion exchange material in the ERIX unit so that it is not subjected to the ion exchange process.

Figure 4:
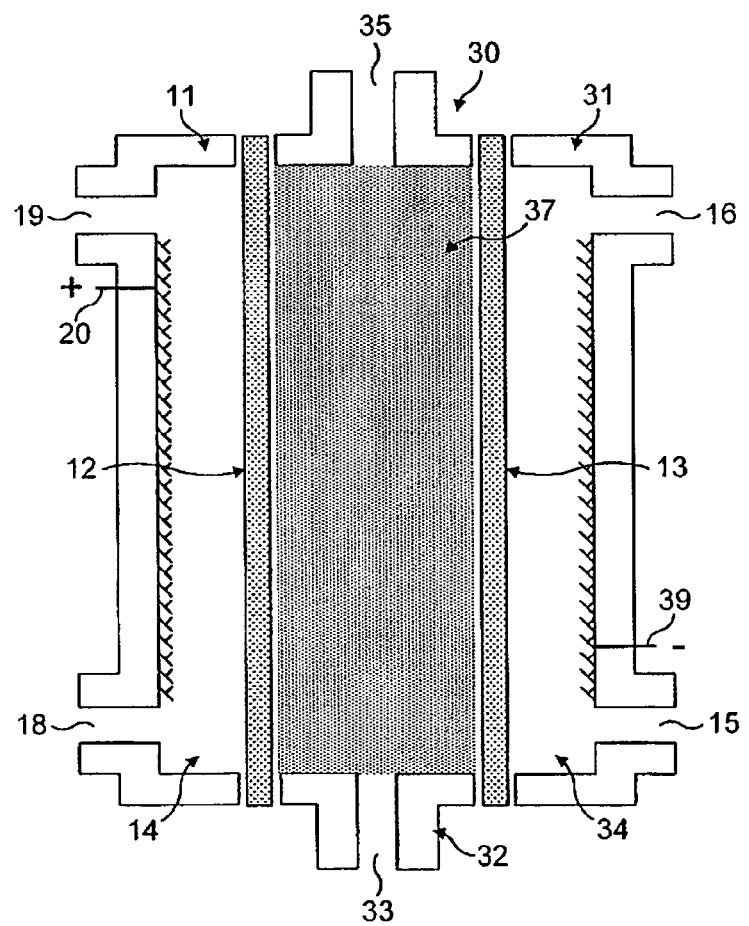
FIG. 4 is a schematic representation of an example of an electrochemical cell which may be used in the apparatus shown in FIGS. 1, 2 and 3.

Turning now to FIG. 4 of the drawings, there is shown an example of an electrochemical cell suitable for incorporation into the closed loop circulation systems shown in FIGS. 1 to 3.

The electrochemical cell 30 shown in FIG. 4 comprises an electrode assembly 11 and an electrode assembly 31 spaced apart by a dividing section 32 which incorporates an inlet port 33 and an outlet port 35 for aqueous solution. The electrode assemblies 11 and 31 and dividing section 32 together define a solution compartment 37.

The electrode assemblies are separated from the solution compartment by suitable ion permeable membranes, 12 and 13, that allow cations to move into a cathode compartment 34 and anions to move into an anode compartment 14. The anode compartment 14 contains an anode 20 and the cathode compartment 34 contains a cathode 39.

Catholyte solution can be introduced and removed from the cathode compartment 34 through ports 15 and 16 and anolyte solution can be introduced and removed from the anode compartment 14 through ports 18 and 19. The solution compartment 37 is filled with suitable ion exchange material for the anions and cations to be adsorbed.

The aqueous solution of fluoride and ammonium ions passes continuously through the compartment 37 via inlet 33 and outlet 35 and within the cell the ions are adsorbed onto the resin. An electrical potential between the electrodes 20 and 39 causes fluoride ions to be adsorbed on and to pass through the ion exchange layer to membrane 12 and through that membrane into the anode compartment 14, and ammonium ions to be adsorbed on and to pass through the ion exchange layer to membrane 13 and through that membrane into the cathode compartment 34, generating concentrated fluoride and ammonium solutions in the anode and cathode compartments, respectively. Aqueous solution depleted in fluoride ions and ammonium ions flows out of the cell through outlet port 35, In an example of the method of the invention, carried out using apparatus as shown in FIG. 2 of the drawings, a waste water feed of 10,000 litres per hour containing 500 ppm fluoride was passed into the ERIX unit which achieved a fluoride removal efficiency of 100%, i.e. the treated water exiting the ERIX unit was free of fluoride ions. 6,300 litres per hour of 1500 ppm calcium hydroxide liquor was passed to the precipitation unit which achieved 100% removal of precipitated solids. 6,300 litres per hour of fluoride containing liquor from the precipitation unit was recycled to the ERIX unit.

What is claimed is:

1. A method for treating an aqueous stream containing both anionic and cationic species, the method comprising steps of:
continuously circulating water through a loop incorporating an ion adsorption unit comprising a water permeable layer of an ion adsorbing material;
feeding to the loop an aqueous solution containing the anionic species and the cationic species;
continuously passing the circulating water and the aqueous solution containing the anionic species and the cationic species through the ion adsorbing material in the ion adsorption unit while applying an electric potential across a thickness of the water permeable layer of the ion adsorbing material and removing from the ion adsorption unit an anolyte containing the anionic species in an increased concentration and a catholyte containing the cationic species in an increased concentration;

continuously discharging from the ion adsorption unit the catholyte;

continuously discharging from the ion adsorption unit the aqueous solution depleted in the anionic species and cationic species as a result of the aqueous solution passing through the ion adsorption unit;

continuously passing the anolyte through a reaction unit in which the anionic species reacts with a reactant added to the reaction unit to form a water-insoluble solid material;

removing the water-insoluble material from the reaction unit;

continuously passing eluate from the reaction unit to the ion adsorption unit; and, if necessary, adding to the loop a quantity of water corresponding to the quantity of the aqueous solution removed from the reaction unit.

2. A method according to claim 1, wherein the anionic species is fluoride and the cationic species is ammonium.

3. A method according to claim 2, wherein the reaction unit comprises a calcium precipitation unit and the reactant is calcium that reacts with the fluoride to form solid $CaF_2$.

4. A method according to claim 3, wherein a source of calcium as a solution or slurry is continuously admitted to the calcium precipitation unit.

5. A method according to claim 4, wherein the source of calcium is a slurry of calcium carbonate or of calcium hydroxide.

6. A method according to claim 4, wherein the aqueous solution continuously discharged from the ion adsorption unit is used to prepare the solution or slurry of calcium.

7. A method according to claim 4, wherein eluate from the calcium precipitation unit is used to prepare the solution or slurry of calcium.

8. A method according to claim 4, wherein the amount of calcium admitted to the calcium precipitation unit is less than the stoichiometric amount for capturing fluoride, and wherein a fluoride containing eluate from the calcium precipitation unit is recycled to the ion adsorption unit to combine with the anolyte.

9. An apparatus for use in treating an aqueous stream containing both anionic and cationic species, the apparatus comprising:

a circulation system containing (i) an ion adsorption unit comprising a water permeable zone of an ion adsorbing material and means for enabling an electrical potential to be applied across a thickness of that zone and (ii) a reaction unit in which one of the anionic and cationic species is rendered substantially insoluble;

a pump for continuously circulating an aqueous solution around a loop of the circulation system;

an inlet for receiving an aqueous solution containing the anionic and cationic species and eluate from the reaction unit to the ion adsorption unit;

an outlet for discharging a concentrated aqueous solution of the anionic species from an anode chamber of the ion adsorption unit or the cationic species from a cathode chamber of the ion adsorption unit;

an outlet for discharging a depleted aqueous solution from the ion adsorption unit;

an outlet for discharging an insoluble material from the reaction unit; and an inlet for receiving water into the circulation system.

10. Apparatus according to claim 9, wherein the reaction unit is a calcium fluoride precipitation unit which comprises an inlet for an aqueous solution or slurry of a calcium source, an inlet for concentrated aqueous fluoride solution, an outlet for calcium fluoride and an outlet for aqueous fluoride eluate.

11. Apparatus according to claim 10, wherein the inlet for the aqueous solution or slurry of the calcium source is operatively connected to a mixing vessel in which the calcium source is mixed with water.

12. Apparatus according to claim 11, wherein the mixing vessel is operatively connected to the outlet for depleted aqueous solution from the ion adsorption unit.

13. Apparatus according to claim 11, wherein the mixing vessel is operatively connected to the outlet for aqueous fluoride eluate from the calcium fluoride precipitation unit.

* * * * *